United States Patent
Trythall et al.

(10) Patent No.: US 11,112,860 B2
(45) Date of Patent: Sep. 7, 2021

(54) HELMET TRACKER BUFFETING COMPENSATION

(71) Applicant: BAE SYSTEMS PLC, London (GB)

(72) Inventors: Simon Trythall, Rochester (GB); John Richard Williams, Rochester (GB); Peter Michael Knight, Rochester (GB)

(73) Assignee: BAE SYSTEMS PLC, London (GB)

( * ) Notice: Subject to any disclaimer, the term of this patent is extended or adjusted under 35 U.S.C. 154(b) by 483 days.

(21) Appl. No.: 15/758,750

(22) PCT Filed: Sep. 12, 2016

(86) PCT No.: PCT/GB2016/052810
§ 371 (c)(1),
(2) Date: Mar. 9, 2018

(87) PCT Pub. No.: WO2017/042588
PCT Pub. Date: Mar. 16, 2017

(65) Prior Publication Data
US 2020/0241631 A1     Jul. 30, 2020

(30) Foreign Application Priority Data
Sep. 11, 2015   (GB) ...................................... 1516121

(51) Int. Cl.
*G06F 3/01*     (2006.01)
*G01C 21/16*    (2006.01)

(52) U.S. Cl.
CPC ............. *G06F 3/012* (2013.01); *G01C 21/16* (2013.01)

(58) Field of Classification Search
None
See application file for complete search history.

(56) References Cited

U.S. PATENT DOCUMENTS

| 5,138,555 A | * | 8/1992 | Albrecht | .............. G02B 27/017 340/980 |
| 5,447,166 A | * | 9/1995 | Gevins | .................. A61B 5/377 600/544 |

(Continued)

FOREIGN PATENT DOCUMENTS

| GB | 2527503 A | 12/2015 |
| WO | 9720244 A1 | 6/1997 |

OTHER PUBLICATIONS

International Search Report and Written Opinion dated Dec. 21, 2016 issued in PCT/GB2016/052810.

(Continued)

*Primary Examiner* — Lina M Cordero
*Assistant Examiner* — Brandon J Becker
(74) *Attorney, Agent, or Firm* — Scully, Scott, Murphy & Presser, P.C.

(57) ABSTRACT

A method and apparatus are provided for determining the orientation of an object relative to a platform likely to be exposed to buffeting. The object may be a helmet worn by a pilot in which orientation of the helmet relative the aircraft while in flight may usefully be known, in particular when determining the position of space-stabilised symbols being displayed in an associated helmet-mounted digital display system. According to the method, not only may orientation of an object may be predicted at some time ahead of a time point of validity of source sensor data, but the prediction may be dynamically configured to according to a detected severity of buffeting to reduce the effects of the buffeting upon the quality of data output by the system. The method includes measuring the severity of any buffeting using the same source data as used to determine orientation of the object.

19 Claims, 4 Drawing Sheets

(56) References Cited

U.S. PATENT DOCUMENTS

| | | | | |
|---|---|---|---|---|
| 7,267,006 | B2* | 9/2007 | Malvern | G01P 1/006 |
| | | | | 73/514.32 |
| 8,952,869 | B1* | 2/2015 | Weaver | G06F 3/147 |
| | | | | 345/8 |
| 8,965,942 | B1* | 2/2015 | Rossum | H03K 5/26 |
| | | | | 341/61 |
| 2004/0051680 | A1* | 3/2004 | Azuma | G03B 13/28 |
| | | | | 345/8 |
| 2004/0149036 | A1* | 8/2004 | Foxlin | A61B 5/1113 |
| | | | | 73/511 |
| 2005/0156817 | A1* | 7/2005 | Iba | G02B 27/017 |
| | | | | 345/8 |
| 2008/0021332 | A1* | 1/2008 | Brainard | A61B 5/02416 |
| | | | | 600/483 |
| 2010/0283919 | A1* | 11/2010 | Cernasov | G06F 3/012 |
| | | | | 348/739 |
| 2012/0131129 | A1* | 5/2012 | Agarwal | H04L 43/0852 |
| | | | | 709/216 |
| 2013/0154936 | A1 | 6/2013 | Laso-Leon et al. | |
| 2014/0062880 | A1 | 3/2014 | Saint-Requier et al. | |
| 2014/0354515 | A1 | 12/2014 | LaValle et al. | |
| 2015/0141043 | A1 | 5/2015 | Abramson et al. | |
| 2017/0115488 | A1* | 4/2017 | Ambrus | G06T 11/60 |

OTHER PUBLICATIONS

GB Search Report dated Mar. 11, 2016 issued in GB 1516121.9.
GB Search Report dated Feb. 28, 2017 issued in GB 1615437.9.
Welch, G.F "History: The Use of the Kalman Filter for Human Motion Tracking in Virtual Reality", Presence, Feb. 2009, vol. 18, No. 1, pp. 72-91.
Zaoui, M. et al., "A 6 D.O.F. Opto-inertial Tracker for Virtual Reality Experiments in Microgravity", Acta Astronautica, 2001, vol. 49, No. 3-10, pp. 451-462.
International Preliminary Report on Patentability and Written Opinion dated Mar. 22, 2018 received in International application No. PCT/GB2016/052810.

* cited by examiner

HELMET TRACKER BUFFETING COMPENSATION

The present invention relates to the tracking of an object and in particular, but not exclusively, to the determination and tracking of orientation of the object. The present invention finds particular application in the determination and tracking of orientation of a helmet or other body-worn device when worn by a user likely to be exposed to buffeting or similar rapid induced changes in orientation when travelling on or within a moveable platform, such as an aircraft. The present invention also extends to a head or helmet-mounted display system incorporating such a tracking system to provide head or helmet orientation data for use in positioning display artefacts in a display.

It is known to include a helmet or head tracker system in a helmet or head-mounted display system in which the positioning of symbols or other artefacts in the display is to be determined according to orientation of the user's head relative to a movable reference frame, for example relative to a cockpit or other interior region of an aircraft or to a driver's or other position in a land vehicle or other type of vehicle.

Various different types of tracker system are known, using a variety of different sensor technologies. For example, Proc. SPIE 8735, Head- and Helmet-Mounted Displays XVIII: Design and Applications, 873502 (May 16, 2013) describes a hybrid optical/inertial helmet tracker system for use with head and helmet-mounted displays. An example of a helmet tracker using electromagnetic techniques is available from Polhemus® Inc, for example as described in a White Paper entitled 'Accuracy and Resolution in Electromagnetic 6 Degree-of-freedom (6DOF) Measurement Systems', APB 8500-001A, available from http:///www.polhemus.com. However, known tracker systems are not generally able to anticipate some of the particular needs of head or helmet-mounted digital display systems relying upon an associated tracking system to supply orientation data that can be used to generate and position space-stabilised symbols or other artefacts in the display, i.e. symbols that appear to a user of the display to be fixed in a far-field view of space, aligned with an externally visible point or object, despite head movement. In particular, known tracker systems are not resilient to certain operating conditions known to occur in aircraft, such as buffeting.

The present invention is defined, in its various aspects, in the attached claims. In particular, according to a first aspect of the present invention, there is provided a tracker system for determining orientation of an object, comprising:

a sensor arrangement associated with the object, arranged to output rate data providing a cyclic indication of a rate of change in orientation of the object;

a predictor component arranged to receive rate data output by the sensor arrangement and to determine from the received rate data an orientation of the object at a predetermined prediction time period ahead of a time point of validity of the received rate data;

a buffeting measurement component arranged to receive rate data output by the sensor arrangement and to determine therefrom a measure of buffeting severity upon the object; and a buffeting compensation component arranged to adjust the operation of the predictor component to compensate for a determined measure of buffeting severity by the buffeting measurement component.

Advantageously, the present invention is able not only to help to overcome latency in responding to changes in orientation of an object by user systems, but also to detect certain operating conditions of buffeting or other induced rapid changes in orientation of the tracked object that would have potentially adverse effects upon the performance of known tracker systems, and to modify tracker operation to reduce their effects. Moreover, the present invention is able to detect the presence and severity of buffeting using the same source orientation rate of change data as used by the predictor component to determine orientation of the object.

In an example embodiment, the buffeting measurement component is arranged to calculate a measure of buffeting severity using a two-stage filtering process whereby, at a first stage, upon receipt of each new instance of rate data from the sensor arrangement, a difference is determined between a weighted average of prior-received rate data and a mid-history instance of received rate data and, at a second stage, the measure of buffeting severity in respect of the new instance of rate data is determined as the difference between a weighted average of the prior-determined differences and a mid-history determined difference.

In an example embodiment, the weighted averages are determined using a symmetric weighting profile applied across a history of the received rate data. For example, the symmetric weighting profile may comprise a half-sine-wave profile or a profile of uniform weighting.

Advantageously, the buffeting measurement component further comprises a third filter stage arranged to apply a low-pass filter with uniform weighting to the determined measures of buffeting severity.

In an example embodiment, the predictor component is arranged, upon receipt of a new instance of rate data from the sensor arrangement, to estimate an average rate of change in orientation of the object over an estimation time period ahead of a time point of validity of the new instance of rate data and to integrate the estimated average rate of change over an integration time period to give an estimate of the change in orientation of the object, adding the estimated change in orientation to an orientation determined by integrating the received new instance of rate data to give a predicted orientation of the object.

The buffeting compensation component may be arranged to adjust at least one of the estimate time period and the integration time period of the predictor component in dependence upon the determined measure of buffeting severity.

In another example embodiment, the tracker system may further comprise an output filter component arranged to receive output by the predictor component and to apply thereto a finite impulse response filter with adjustable latency and wherein the buffeting compensation component is arranged further to adjust the latency of the applied finite impulse response filter according to the determined measure of buffeting severity. The output filter may for example implement a Hanning finite impulse response filter.

In example embodiment, the object is a head or helmet or other body-worn item to which the inertial sensor arrangement is attached and the sensor arrangement is arranged to determine and to output rate data indicative of a rate of change in orientation of the head or helmet or other body-worn item.

According to a second aspect of the present invention there is provided a computer-implemented method for determining orientation of an object, comprising the steps:

(i) receiving, from a sensor arrangement associated with the object, rate data providing a cyclic indication of a rate of change in orientation of the object;

(ii) determining, from rate data received over a number of cycles, a measure of buffeting severity upon the object; and (iii) predicting, from received rate data, using a configurable prediction process, an orientation of the object at a predetermined prediction time period ahead of a time point of validity of the received rate data, wherein the determined measure of buffeting severity determines one or more operating parameters in the configurable prediction process.

In an example embodiment of the method, at step (ii), the measure of buffeting severity is determined using a two-stage filtering process whereby, at a first stage, upon receipt of each new instance of rate data from the sensor arrangement at step (i), a difference is determined between a weighted average of prior-received rate data and a mid-history instance of received rate data and, at a second stage, the measure of buffeting severity in respect of the new instance of rate data is determined as the difference between a weighted average of the prior-determined differences and a mid-history determined difference.

The weighted averages may be determined using a symmetric weighting profile applied across a history of the received rate data. The symmetric weighting profile may for example comprise a half-sine-wave profile or a profile of uniform weighting.

In another example embodiment, step (ii) further comprises applying a low-pass filter with uniform weighting to the determined measure of buffeting severity.

In an example embodiment, the configurable prediction process comprises, upon receipt of a new instance of rate data at step (i), estimating an average rate of change in orientation of the object over an estimation time period ahead of a time point of validity of the received new instance of rate data and to integrate the estimated average rate of change over an integration time period to give an estimate of the change in orientation of the object, adding the estimated change in orientation to an orientation determined by integrating the received new instance of rate data to give a predicted orientation of the object.

Advantageously, at step (iii), at least one of the estimate time period and the integration time period of the configurable prediction process is adjusted in dependence upon the determined measure of buffeting severity.

In an example embodiment, the method further comprises the step of applying a finite impulse response filter with adjustable latency to an output by the predictor component wherein the latency of the finite impulse response filter is adjusted according to the determined measure of buffeting severity. The applied filter is a Hanning finite impulse response filter, for example.

According to a third aspect of the present invention, there is provided a head or helmet-mounted digital display device arranged to display space-stabilised symbols or other space-stabilised display artefacts, including a tracker system for determining orientation of the head or helmet according to the first aspect of the present invention in which the object is a head or a helmet on which is mounted the head or helmet-mounted display and wherein the predetermined prediction time period corresponds to an expected time of displaying a space-stabilised symbol or other space-stabilised display artefact positioned by the display device to take account of an orientation of the head or helmet indicated by an output of predicted orientation by the tracker system.

According to a fourth aspect of the present invention, there is provided a computer program product comprising a data carrier having stored thereon software code means, or means for access thereto, which when installed and executed upon a digital processor are arranged to implement the method steps according to the second aspect of the present invention.

According to a fifth aspect of the present invention, there is provided a digital processor programmed to implement the method steps according to the second aspect of the present invention.

Example embodiments of the present invention will now be described in more detail with reference to the accompanying drawings, of which:

Figure 1:
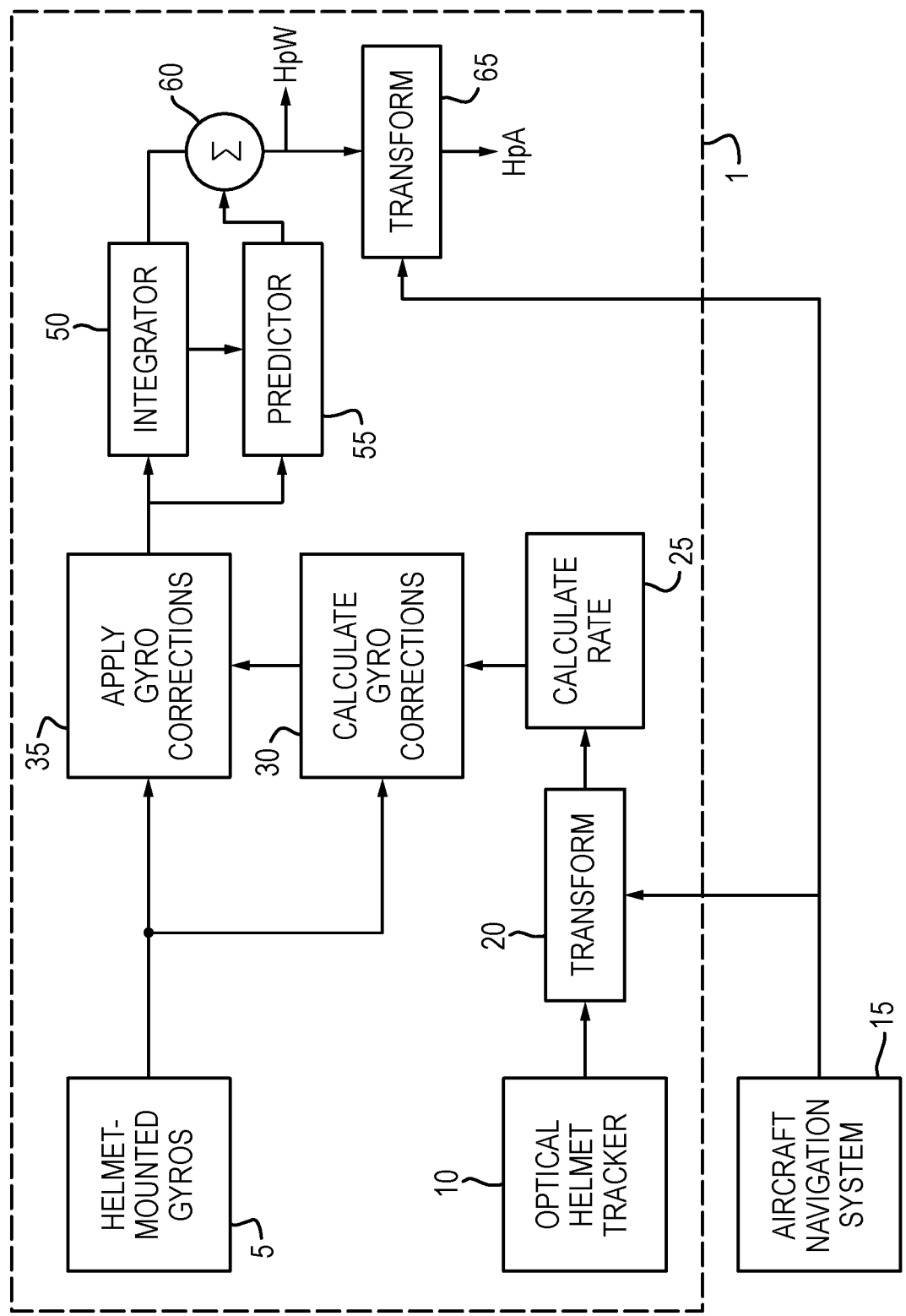
FIG. 1 depicts a functional architecture for a helmet tracker system suitable for incorporation of example embodiments of the present invention.

A system according to example embodiments of the present invention is arranged to determine and to monitor the orientation of an object taking account of the effects of buffeting or other effects involving high and varying induced rates of change in orientation of the object over short time periods. The orientation of the object may be determined in inertial space or relative to a moveable platform on which the object may be travelling or is otherwise associated. The object may be considered associated with the moveable platform if the magnitude of relative velocity of the object and the moveable platform is substantially zero at a time of determining the object's orientation relative to the platform. Embodiments of the present invention will be described below in the example context of a helmet tracker system intended for use with the helmet of a pilot of an aircraft. More particularly, embodiments of the present invention will be described in the context of such a helmet tracker system when used in association with a helmet-mounted display system. However, the present invention may be applied to the tracking of orientation of other types of object associated with a moveable platform.

The description that follows is of a logical system architecture designed to explain the principles underlying operation of a helmet tracker system incorporating embodiments of the present invention. It will be clear to a notional skilled person that the helmet tracker system may be implemented using an object-oriented data processing architecture in which functional components of the system may be combined and distributed differently to that in a logical sequential architecture to be described below. However, the principles of operation are likely to remain substantially unchanged and the description that follows may at least serve as a detailed requirements specification for the functions to be implemented in whatever data processing architecture is chosen.

For the purposes of the description that follows, the following conventions and terminology will be assumed for the labelling of axes and rotations. Axes will be labelled 'x', 'y' and 'z' and angles of rotation will be labelled as $\psi$, $\theta$ and $\varphi$. Where the angles of rotation as defined as Euler angles: $\psi$ is an Azimuth angle; $\theta$ is an Elevation angle; and $\varphi$ is a Roll angle. Where axes and rotations are defined with respect to Avionic Axes, the following conventions will apply:

axes are defined with respect to an origin O of a moveable object (e.g. helmet or aircraft), the origin O and direction of the axes being defined typically according to mechanical criteria;

+x is a forward direction;
+y is to the right;
+z is downwards;
+ψ is a clockwise rotation ('yaw') about the +z direction;
+θ is a clockwise rotation ('pitch') about the +y direction;
+φ is a clockwise rotation ('roll') about the +x direction.

For convenience, the orientation of a tracked object or helmet and the orientation of a moveable platform or aircraft, relative to a given frame of reference, will be defined using quaternions.

In a typical head or helmet-mounted display system, a waveguide display or a visor projection display arrangement is provided; generating images visible to one or both eyes of a user. The images are typically in the form of symbols or other display artefacts, displayed so as to appear overlain on an external scene viewable through the otherwise transparent waveguide or visor, the waveguide or visor acting as a combiner. The symbols or other display artefacts may include anything from monochrome symbols in a predetermined symbology set, data or other text information through to full colour video imagery or a view provided of the external scene by a night vision camera during night-time use.

There are two particular situations in which helmet orientation needs to be taken into account when positioning symbols within a helmet-mounted display: display of symbols of a virtual head-up display, geometrically aligned to a centre line of the aircraft; and display of symbols such that they appear in fixed alignment with a ground-based object or other object in a fixed position relative to the Earth, viewable outside the aircraft. In each case the orientation of one or both of the helmet relative to the aircraft and the aircraft relative to the Earth may be changing, the former potentially rapidly. In particular, the helmet and hence the tracker system sensors may be subject to periods of buffeting which may seriously impair the functionality of known tracker systems during such periods.

Various different head or helmet tracking systems are known based upon inertial sensor technologies, non-inertial sensor technologies or a mixture of inertial and non-inertial sensor technologies. For example, in a helmet tracker system for use in an aircraft or other type of enclosed space, an optical tracker system may be used comprising a fixed arrangement of infra-red light-emitting diodes (LEDs) mounted on the helmet and an array of cameras mounted at known positions in a surrounding cockpit or cabin. Helmet orientation may be tracked by energising the LEDs in controlled patterns in a regular pulse cycle and processing the camera images of the helmet LEDs. Each pulse cycle provides an independent opportunity to determine helmet orientation.

It is also known to use an electro-magnetic tracker arrangement or an acoustic tracker arrangement in such confined spaces comprising a combination of sensors and transmitters, with the transmitters mounted on the helmet and the sensors at fixed positions within the space, or vice versa.

One disadvantage of optical or equivalent non-inertial tracker systems when used with display systems is an inherent latency in determining updates to helmet orientation. This latency may be compounded with any inherent latency in adjusting symbol positions in an associated display system such that the overall system response to determined changes to helmet orientation can cause pilot nausea. This occurs when movements of the head do not result in substantially simultaneous and corresponding movements in displayed symbols intended to appear fixed to some external reference point. Attempts to minimise latency in such applications have led to the use of miniature inertial sensors, be they accelerometers, tilt sensors or miniature gyroscopic sensors, small enough to be mounted on the helmet with two or three such sensors being aligned with respective orthogonal axes ('gyro axes'). Inertial sensors are capable of producing data indicative of a rate of change of orientation more quickly than optical, magnetic or acoustic sensors, for example, are capable of indicating a change in orientation. However, miniature inertial sensors of a type suitable for helmet-mounting may output orientation rate data that is prone to varying bias errors, noise or other types of 'installation' or 'misalignment' error, for example arising from imprecise mounting on the helmet and non-orthogonality of the gyro axes from manufacture.

It is known to combine inertial sensors on the helmet with a non-inertial helmet orientation sensor system and to combine data from the two sources in a process to calculate and to apply corrections to the inertial sensor rate data. This helps to prevent the accumulation of errors when calculating helmet orientation from the inertial sensor measurements.

In the present invention a hybrid helmet tracker system has been devised that is particularly suited for use with helmet-mounted display systems, addressing the problems in data quality from the helmet movement sensor systems, the effects of helmet buffeting and of latency in the associated display system.

The hybrid tracker system of the present invention combines inertial sensors mounted on the helmet with an optical helmet tracker system. A number of processing components are provided to process the data output from those sources in a novel and inventive way to determine helmet orientation relative to the inertial reference frame, or 'World axes', and helmet orientation relative to a moveable reference frame, such as an aircraft or other type of land or sea vehicle that the user may be piloting or in which the user may otherwise be riding. Moreover, helmet orientation is determined in such a way as substantially to eliminate delay in adjusting the position of displayed imagery in an associated helmet-mounted display system when responding to changes to helmet orientation, while minimising the effects of helmet buffeting.

In the description that follows, data variables will be named according to the naming structure <Treatment> <Tracked Frame> <Data Type>$_{<Data\ Source>}$<Reference Frame> in which:

<Treatment> defines any pre-processing applied to the data, in particular

'f'—indicates the data are filtered, using a known or specified filtering technique, and 'i'—indicates that the data comprise an interpolated value derived from two consecutive measures of the respective variable;

<Tracked Frame> comprises an upper case letter designating the frame of axes being tracked and to which the data relates, including 'H'—Helmet Shell (helmet-referenced axes),
'G'—Helmet-mounted Gyros (gyro axes), and
'A'—Aircraft (aircraft-referenced axes);

<Data Type> is used to designate data defining a 'Rate' of change, as applicable;

\<Data Source\> is a lower case letter, as a subscript, defining the most recent origin of the data, i.e. the sensor system or processing stage from where the data were generated, including 'o'—Optical Helmet Tracker,
'g'—Helmet-mounted Gyros, and
'c'—gyro data Corrector; and \<Reference Frame\> defines the frame of reference relative to which the data define the orientation of the Tracked Frame, including 'W'—axes of the inertial frame of reference, also referred to as 'World axes' or 'inertial space', and
'A'—axes fixed to the Aircraft.

Overview of Core Components

Core components and functionality of an example embodiment of a hybrid helmet tracker system of the present invention, or in which embodiments of the present invention may be incorporated, will now be described in outline with reference to FIG. 1. For convenience, orientation of a tracked entity with respect to defined axes will be expressed as a quaternion, unless otherwise specified.

Referring to FIG. 1, a logical architecture depicts, from a functional perspective, a set of core components of the hybrid helmet tracker system 1 for determining helmet orientation relative to a host aircraft. In such an application, the hybrid helmet tracker system 1 makes use of sensor data from three sources.

An arrangement of helmet-mounted inertial sensors—Helmet-mounted Gyros 5—comprising three miniature gyroscopes (gyros), e.g. microelectromechanical systems (MEMS) gyros, each associated with a respective one of three nominally orthogonal gyro axes. Each gyro is able to sense a rate of change in orientation of the system of Helmet-mounted Gyros 5 in inertial space, resolved along its respective gyro axis. The system 5 generates rate vectors $GRate_g$ at a frequency of several kilohertz, whose components define the rate of change in orientation of the gyro system 5 sensed by the individual gyros about their respective gyro axes.

An Optical Helmet Tracker system 10 including components mounted on the helmet and in the cockpit of an aircraft to determine orientation of the helmet $H_oA$, i.e. orientation of a set of helmet-referenced axes relative to aircraft axes, and to output data indicative of a determined helmet orientation, typically at a frequency of 180 Hz.

An Aircraft Navigation System 15, though not a component of the hybrid helmet tracker 1 of the present invention, typically based upon an inertial sensor system using laser gyroscopes. The Aircraft Navigation System 15 outputs data, from time to time (typically once every 20 ms to 90 ms), defining orientation of the aircraft, specifically of a set of aircraft-referenced axes, relative to a navigation frame of reference, typically a 'local level north' pointing frame of reference. For the purposes of the present invention, aircraft orientation data output by the Aircraft Navigation System 15 may be received by the hybrid helmet tracker 1 and used as a measure of aircraft orientation AW relative to the inertial reference frame. Variations in the alignment of the navigation frame and the inertial reference frame due Earth rotation and movement of the aircraft over the ground may be validly ignored over the time periods during which these data are used in the present invention, as will become clear from the description that follows.

A typical Aircraft Navigation System 15 has an interface to and outputs data over a standard data bus, one example being MIL-STD-1553B, provided within the aircraft. The Aircraft Navigation System 15 outputs an updated measure of aircraft orientation AW over the data bus so that it may be received by whichever of the installed aircraft systems require it. The hybrid helmet tracker 1, in particular, may be linked to the standard data bus so that it may also receive updated aircraft orientation data from the Aircraft Navigation System 15. However, as an alternative source of data defining aircraft orientation relative to the inertial reference frame, an inertial or other type of sensor arrangement able to determine aircraft orientation in inertial space may be mounted within the aircraft for use by the hybrid tracker system 1.

In example embodiments of the present invention, helmet orientation is determined on a cyclic basis, corresponding to a need to reposition certain types of symbol, according to changing helmet orientation, being displayed in an associated digital helmet-mounted display. During each cycle—to be referred to as a 'tracker cycle'—helmet orientation is determined from data supplied by the Helmet-mounted Gyros 5, any errors in those inertial sensor data being firstly corrected with reference to data supplied by the Optical Helmet Tracker 10 in combination with aircraft orientation data received over the data bus. Conveniently, the duration of a tracker cycle may be arranged to match the period between successive image refreshes in the associated digital display, although this is not essential.

In embodiments of the present invention, when calculating corrections to inertial sensor data, for example, it has been found convenient to work with data defining orientation of a helmet as sensed by the different associated sensor systems (5, 10) referenced to a common frame of reference—to the inertial frame of reference, also referred to herein as 'inertial space' or 'World axes'. Data output by the Helmet-mounted Gyros 5 relate to motion of the gyros in inertial space whereas data output by the Optical Helmet Tracker 10 define motion of the helmet relative to a frame of reference fixed to the aircraft. It is therefore desirable to relate aircraft-referenced data from the Optical Helmet Tracker 10 to inertial space. With this objective in mind, a Transform component 20 is provided to receive a measure of helmet orientation $H_oA$ relative to the aircraft from the Optical Helmet Tracker 10 expressed as a quaternion and to transform it by quaternion multiplication into a derived helmet orientation $$H_oW = AW \times H_oA \quad (1)$$

relative to the inertial reference frame using the aircraft orientation AW received over the standard bus from the Aircraft Navigation System 15. If the Optical Helmet Tracker 10 uses a different convention for defining orientation to that used by the Aircraft Navigation System 15 or by the system of Helmet-mounted Gyros 5, then the Transform component 20 is also arranged to convert the output of the Optical Helmet Tracker 10 so as to express helmet orientation using the same convention as used by the other two sensor systems 5, 15.

As a further convenience, for the purposes of subsequent data processing combining rate-of-change data from the Helmet-mounted Gyros 5 with data from the Optical Helmet Tracker 10, a Calculate Rate component 25 is provided to 'differentiate' the optically-sensed orientation measurements $H_oW$ to provide a rate of change of orientation vector $HRate_o$, over a predetermined time interval, representing a point in a 'derived object orientation rate space' or, in the case of a helmet tracker, a 'derived helmet orientation rate space'. That is, the components of a rate vector $HRate_o$ define the derived optically-sensed rates of change in helmet orientation in inertial space resolved along the object-referenced or helmet-referenced axes. In an ideal arrangement, the axes of the Helmet-mounted Gyros 3 are substantially aligned with the helmet-referenced axes. However, in practice, there are likely to be differences in alignment or other installation-related or manufacturing errors.

Besides errors arising during installation or manufacture, rate data output by miniature gyros of a type suitable for helmet mounting may be subject to 'noise', characterised by the distribution in rate measurements output over a series of rate vectors $GRate_g$ for a given helmet movement, or even when the gyros are stationary. Additional data filtering components may also be included (not shown explicitly in FIG. 1) to apply various filtering techniques to rate data received from the Helmet Mounted Gyros 5 and to rate data derived (25) from measurements by the Optical Helmet Tracker 10 to reduce the effects of noise.

More significantly, rate data output from individual gyros are also likely to include bias errors, typically of the order of 0.1°/min or more, which may also change, for example with varying temperature of the gyros, causing accumulating errors in determined orientation of the helmet if not corrected for.

For these reasons it is also known to include a non-inertial sensor arrangement—in example embodiments of the present invention the Optical Helmet Tracker 10 provides such a non-inertial sensor arrangement—to provide data from which corrections to gyro rate data may be calculated.

A processing component—Calculate Gyro Corrections 30—is provided to receive filtered $HRate_o$ rate vectors and the corresponding filtered GRate gyro rate vectors from the Helmet-mounted Gyros 5 and to determine corrections for any installation or manufacturing-related errors in the gyro rate data. Specifically, such errors may include: errors in alignment of the gyro axes with the helmet-referenced axes during installation of the Helmet-mounted Gyro system 5 upon a helmet; errors due to non-orthogonality of the gyro axes; and errors due to relative scaling of rate measurements along the gyro axes. The Calculate Gyro Corrections component 30 is also arranged to determine corrections for bias.

The determined corrections are then applied for that tracker cycle by an Apply Gyro Corrections component 35 to a rate vector GRate derived from a respective sample of rate vectors $GRate_g$ output from the Helmet-mounted Gyros 5 thereby to relate the movement sensed by the gyro system 5 more accurately to the actual movement of the helmet. The result is a fully corrected measure of the rate of change in orientation of the helmet as sensed by the Helmet-mounted Gyros 5, expressed as a vector $HRate_c$.

Having applied (35) corrections to the latest inertial sensor data to result in the fully corrected rate vector $HRate_c$, a measure of helmet orientation HW relative to the inertial frame of reference, or World axes, is determined by integration in an Integrator component 50. If required, the derived helmet orientation $H_oW$ with respect to the inertial frame of reference, output by the Transform component 20, may be supplied to the Integrator component 50 for use in correcting an integration error.

A Predictor component 55 is provided to determine how the helmet orientation may have changed relative to the inertial frame of reference over a predetermined time period into the future—a Prediction Time period $T_p$—from the time of validity of the orientation HW determined by the Integrator 50. That time of validity is a time point of validity of the GRate vector for the tracker cycle. The Predictor component 55 receives the corrected rate data $HRate_c$ and applies a prediction technique, to be described in more detail below, to determine the change in helmet orientation over the Prediction Time Period $T_p$ taking account of a configurable length of recent history of helmet movement. The change determined by the Predictor component 55 is added in a summing component 60 to the orientation HW to give a predicted orientation $H_oW$ for the helmet relative to World axes.

A particular benefit of including the Predictor component 55 in the helmet tracker 1 of the present invention is an ability to anticipate the total latency in a process that begins with the capture of data from the Helmet-mounted Gyros 5, indicative of a movement of the helmet, and ends with the display of a repositioned symbol by an associated helmet-mounted display system. The Predictor Component 55 enables the symbol to be repositioned in the display to take account of a helmet orientation expected by the time the repositioned symbol becomes viewable in the display by the pilot—the end of the Prediction Time period $T_p$.

The Integrator component 50 may be implemented separately from the Predictor component 55, or the Integrator component 50 may be incorporated as part of the functionality of the Predictor component 55, as convenient.

The display system may use the predicted helmet orientation $H_pW$ relative to World axes to position symbols in the display that are intended to be aligned with particular ground-referenced features or positions in an external scene visible to the pilot at that time through the display. However, to be able to reposition symbols in a virtual head-up display (HUD) fixed in space relative to the pilot's view (subject to parallax) of the interior of the aircraft (i.e. relative to aircraft axes), a further Transform component 65 is provided to transform the predicted orientation $H_pW$ relative to World axes into a predicted helmet orientation $H_pA$ relative to the aircraft-referenced axes using the latest measure of aircraft orientation AW as supplied over the standard aircraft data bus by the Aircraft Navigation System 15. Any expected latency in the output of updates to aircraft orientation AW by the Aircraft Navigation System 15 has been found unlikely to have a significant effect on the accuracy of the predicted helmet orientation $H_pA$ relative to the aircraft-referenced axes.

The tracker cycle period of the hybrid helmet tracker system 1 is selected, conveniently, to support the needs of the associated display system or other user of the determined helmet orientation data. In the particular example of a digital helmet-mounted display system, it is desirable to be able to update the position of symbols in the display within a time period of no more than 20 ms, but in practice a shorter period is desirable, enabling not only a more rapid update to displayed information but also to a corresponding reduction in the Prediction Time period $T_p$.

As a further convenience, the tracker cycle period may be selected to correspond to the period between successive measurements of helmet orientation by the Optical Helmet Tracker 10, 5.555 ms in the example mentioned above, being generally less responsive to helmet movement than the Helmet-mounted Gyros 5. However, as mentioned above, the tracker cycle period need not necessarily be linked to the performance of the Optical Helmet Tracker 10. In an alternative arrangement, the rate at which data output by the Helmet-mounted Gyros 5 are sampled may be set to be a multiple of the rate at which data are available from the Optical Helmet Teacker 10, enabling a corresponding reduction in the tracker cycle period.

In a particular embodiment, data output from the Helmet-mounted Gyros 5 may be sampled at 180 Hz, for example, and the Optical Helmet Tracker 10 may be operated at a slower rate, for example at 60 Hz—a period of 16.667 ms between successive measurements. For convenience, the tracker cycle rate (the rate at which gyro data are sampled) should be a predetermined multiple of the rate at which the Optical Helmet Tracker 10 is operated.

There are at least two potential advantages of operating the Optical Helmet Tracker 10 at a slower rate than the tracker cycle rate. Firstly, the power of light signals emitted by the Optical Helmet Tracker 10 may be reduced, with consequent savings in power consumption. Secondly, such light signals may be rendered less easily detectable by external agencies, particularly during night-time operation.

It is generally preferred that the tracker cycle of the hybrid helmet tracker 1 is synchronised to the display cycle of the associated display system. If, for any reason, the display cycle is not always synchronised to the tracker cycle, a hardware or software-implemented component may be included at an output of the hybrid helmet tracker system 1 to interpolate one or both of the outputs $H_pW$ and $H_pA$ over successive tracker cycles to determine helmet orientation at some other time point appropriate to the needs of the display system. This ensures that the Predictor 55 is able to operate to a stable Prediction Time $T_p$.

For any given tracker cycle, a sample of rate data from the Helmet-mounted Gyros 5 provides a measure GRate of rate data that is then fully corrected (35) using the latest calculated corrections for errors. The Integrator 50 and Predictor 55 use the corrected rate data $HRate_c$ to determine predicted measures $H_pW$ and $H_pA$ of helmet orientation for that tracker cycle. However, the processes for updating the corrections for errors, calculated by the Calculate Gyro Corrections component 30, may operate over a different cycle—a 'corrections update cycle'—for convenience, corresponding to the rate at which the Optical Helmet Tracker 10 is operated and so the rate at which new data become available for such calculations.

In describing an example embodiment of the present invention, it will be assumed that the Optical Helmet Tracker 10 is operated at the tracker cycle rate and that data from the helmet orientation sensors 5, 10 are available to the correction calculation component 30 at the tracker cycle rate.

It is possible that, from time to time, output from the Optical Helmet Tracker 10 will be temporarily unavailable, for example when light signals passing between the helmet-mounted LEDs and the cockpit-mounted sensors are temporarily blocked by pilot hand movement or otherwise. In such a situation, operation of the helmet tracker process may enter a so-called 'coasting' period during which operation of the Calculate Gyro Corrections component 30 is suspended—there being no new data from the Optical Helmet Tracker 10 on which to base correction calculations. In this situation, the correction being applied to GRate data by the Apply Gyro Corrections component 35 remains unchanged until data from the Optical Helmet Tracker 10 next becomes available and the corrections update cycle may restart. A coasting period may last for one or more tracker cycles, limited by a configurable maximum coasting period to ensure that errors, in particular those due to gyro bias, don't accumulate to unusable levels.

Synchronisation and Filtering

As mentioned above, it is convenient, though not essential, to operate a corrections update cycle at the same rate as the tracker cycle rate. It is also convenient, though not essential, to operate the Optical Helmet Tracker 10 at the tracker cycle rate, the tracker cycle rate being thereby limited to a frequency of 180 Hz, in this example. The rate at which the Optical Helmet Tracker 10 is able to measure changes in helmet orientation would be considered sufficiently rapid to support the needs of an associated helmet-mounted display in repositioning symbols in the display and so, for the purposes of explaining the principles, the following section of description will assume these convenient choices for equalising the correction cycle, tracker cycle and Optical Helmet Tracker rates. These choices are illustrated in FIG. 2, showing the tracker cycle periods for the helmet tracker 1 and hence the periods over which the Predictor 55 operates to determine predicted helmet orientation.

Figure 2:
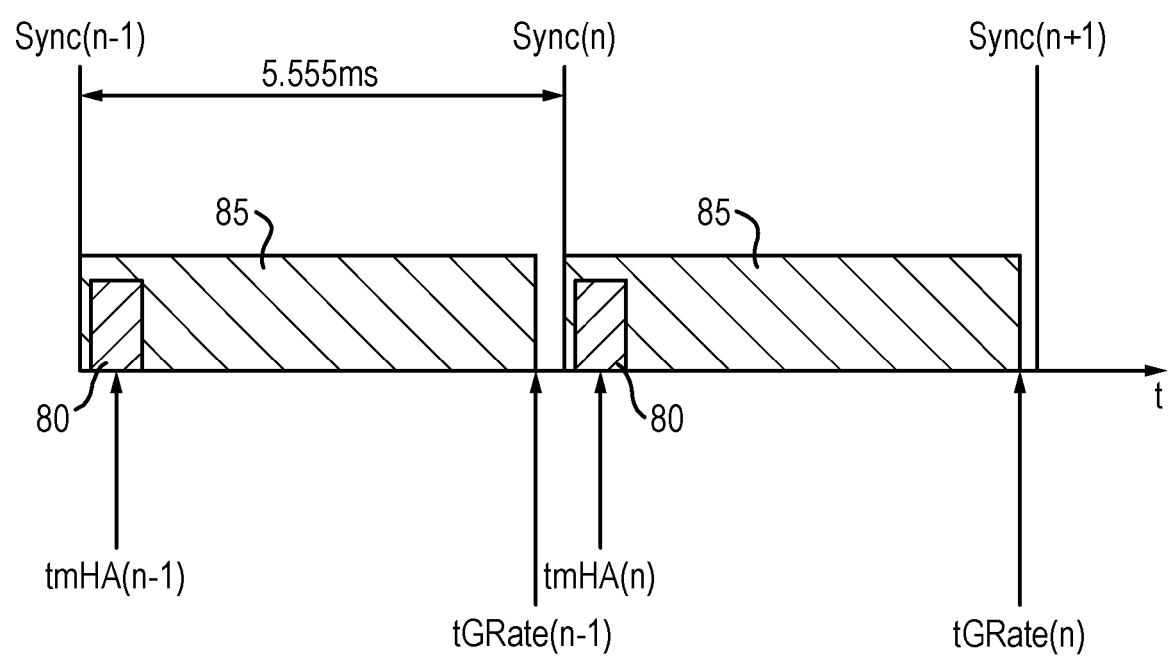
FIG. 2 shows an example timing for a cyclic tracking process implemented by embodiments of the present invention.

Referring to FIG. 1 and additionally to FIG. 2, a time line is shown spanning two complete tracker cycles, n−1 and n, of duration 5.555 ms, beginning at time points Sync(n−1) and Sync(n), respectively. A sample of $GRate_g$ vectors may be captured from the Helmet-mounted Gyros 5 over sampling periods 85 extending over substantially the full duration of each tracker cycle, between time points Sync(n−1) and tGRate(n−1), Sync(n) and tGRate(n), etc. In a first type of filtering (not shown in the figures) that may be applied to each sample of gyro rate data $GRate_g$, an average rate vector GRate may be calculated to provide a single rate vector representative of the captured sample for a given tracker cycle.

For the purposes of deriving a predicted helmet orientation $H_pA$ and $H_pW$ in respect of tracker cycle n for example, the most recently available fully corrected gyro rate vector $HRate_c$ is that calculated based upon a sample of $GRate_g$ vectors captured during the capture period 85 beginning at the time point Sync(n−1) and ending at the time point tGRate(n−1). For the next complete tracker cycle, $HRate_c$ is calculated based upon a sample of $GRate_g$ vectors captured during the capture period 85 beginning at the time point Sync(n) and ending at the time point tGRate(n). For the purposes of predicting helmet orientation by the Predictor 55 during tracker cycle n, the time point of validity of the most recently available sample of rate data from the Helmet-mounted Gyros 5 is the time point tGRate(n−1) at the end of the previous tracker cycle.

Updates to helmet orientation are determined in the Optical Helmet Tracker 10 using regular sets of pulses of infrared light emitted by light-emitting diodes (LEDs), each set of pulses occurring within a short time interval 80 near to the start of each tracker cycle (these pulses would only occur at the beginning of one tracker cycle in every T tracker cycles if the tracker cycle rate was T-times as fast as the Optical Helmet Tracker rate). Each set of LED pulses provides an opportunity to determine helmet orientation and therefore represents a point in time at which a respective determination of helmet orientation $H_oA$ would be considered valid. In FIG. 2a, the labels tmHA(n−1) and tmHA(n) represent the nominal points in time at which an optically-tracked helmet orientation is valid in respect of LED pulses generated during the cycles n−1 and n respectively.

For the purposes of nulling an error of integration, the helmet orientation $H_oW$ should be synchronised to the end of a tracker cycle to match the assumed time points of validity tGRate(n−1), tGRate(n), etc. of the gyro rate data. Given that the Optical Helmet Tracker 10 is only able to determine helmet orientation as it would apply for a tracker cycle n−1 after the set of LED pulses at the time point tmHA(n) during the tracker cycle n, the Transform component 20 may be arranged to derive helmet orientation relative to World axes $H_oW$ for the time point tGRate(n−1) by interpolation between the two measures of helmet orientation $H_oW$ determined in respect of the time points tmHA(n−1) and tmHA(n) to give an interpolated estimate $iH_oW$ of the helmet orientation valid at the end of the tracker cycle n−1. The interpolation step has the effect of delaying the determination of $H_oW$ applicable in respect of tracker cycle n−1 by the time period $$tmHA(n)-tGRate(n-1).$$

That is, for the purpose of correcting an integration error during a tracker cycle n, the time point of validity of the most recently available measure $H_oW$ is an interpolated measure, $iH_oW$, valid at the time point tGRate(n−1), or at the equivalent time point tGRate( ) during an earlier tracker cycle, rather than the measure $H_oW$ generated in respect of the most recent LED pulses at the time point tmHA(n). Availability of a suitably timed measure AW of aircraft orientation in inertial space is required to generate each measure $H_oW$ such that the most recently available combination of synchronised outputs of helmet orientation $H_oA$ from the Optical Helmet Tracker 10 and AW from the Aircraft Navigation System 15 may relate to an earlier tracker cycle than the cycle n−1.

The chosen convention of working with data timed to the end of a tracker cycle is taken into account when determining the Prediction time period $T_p$ to be applied by the Predictor component 55 so that the Prediction Time period $T_p$ is defined relative to the end of the tracker cycle of the latest processed gyro data—the time point of validity of the most recently available integrated helmet orientation HW.

The calculations of gyro error corrections by the component 30 requires, as input, filtered orientation rate data $HRate_o$, derived (25) using successive measures $H_oW$ of orientation data output by the Optical Helmet Tracker 10, substantially synchronised with filtered GRate data captured from the Helmet-mounted Gyros 5, so ensuring that the two input measures relate to the same period of helmet movement. Those data forming an input to the correction calculation component 30 do not necessarily relate to the 'current' tracker cycle during which a fully corrected rate vector $HRate_c$ is to be generated, but they do need to be synchronised with each other. Furthermore, aircraft orientation data AW output by the Aircraft Navigation System 15 and used to derive the helmet orientation $H_oW$ should also be valid at the time of validity of the helmet orientation data $H_oA$ output by the Optical Helmet Tracker 10, i.e. at respective time points tmHA(n−1), tmHA(n), etc. and is assumed valid at a time point mid-way between the respective pair. Various techniques may be applied to ensure that the derived helmet orientation $H_oW$ relative to World axes is calculated using measures of helmet orientation $H_oA$ relative to the aircraft and aircraft orientation AW relative to World axes that are correctly synchronised.

Calculation of Helmet Orientation

The Integrator component 50 receives the fully corrected rate of change in helmet orientation vector $HRate_c$ in respect of the latest complete tracker cycle and inserts it into an integration process to determine a helmet orientation relative to World axes expressed as a quaternion HW. In parallel with this, the Predictor 55 operates to predict how the helmet orientation will change over the Prediction time period $T_p$ from the time point of validity of the helmet orientation HW at the end of the latest complete tracker cycle.

The Predictor 55 operates by firstly estimating the average rate of change of orientation of the helmet over the Prediction time period $T_p$ or over some other 'Estimation Time' period that may vary in certain circumstances, as will be discussed below. The average rate of change may be calculated by means of a Recursive Least-Squares (RLS) filter, acting as an adaptive FIR filter in which the weights are continuously adjusted to match the output to a desired signal. In this case, the desired signal is the average rotation rate vector over the Estimation Time period immediately preceding the latest input. The adaptive part of the filter finds the weights that, when applied to the n inputs immediately preceding the time of the latest input minus the Estimation Time period, best match the rotation rate vector averaged over the most recent period of Estimation Time, where n is the tap count of the filter. These weights are then applied to the n most recent inputs to estimate the mean rotation rate vector over the forthcoming period of Estimation Time.

The estimated rotation rate vector is then integrated over the Prediction Time period $T_p$ to give the predicted change in helmet orientation $H_pH$ relative to the latest determined helmet orientation HW. The predicted helmet orientation $H_pW$ relative to World axes is then obtained by the summing component 60 by quaternion multiplication of the latest helmet orientation HW output by the Integrator 50 and the predicted change in orientation according to the equation:

$$H_pW=HW\times H_pH \qquad (2)$$

The integration process implemented by the Integrator component 50 to integrate received corrected rate vectors $HRate_c$ and to calculate HW may include a process for nulling an integration error, for example with reference to an interpolated estimate $iH_oW$ of helmet orientation derived by the Transform component 20.

As mentioned above, a final stage of filtering may be applied by a Filter component 125 to the predicted helmet orientation $H_pA$ with respect to aircraft axes in a further level of refinement. The final stage of filtering, together with the functionality of the Predictor component 55, may be arranged to take account of the effects of buffeting that may be affecting the helmet in a process that will now be described with reference to FIG. 3.

Figure 3:
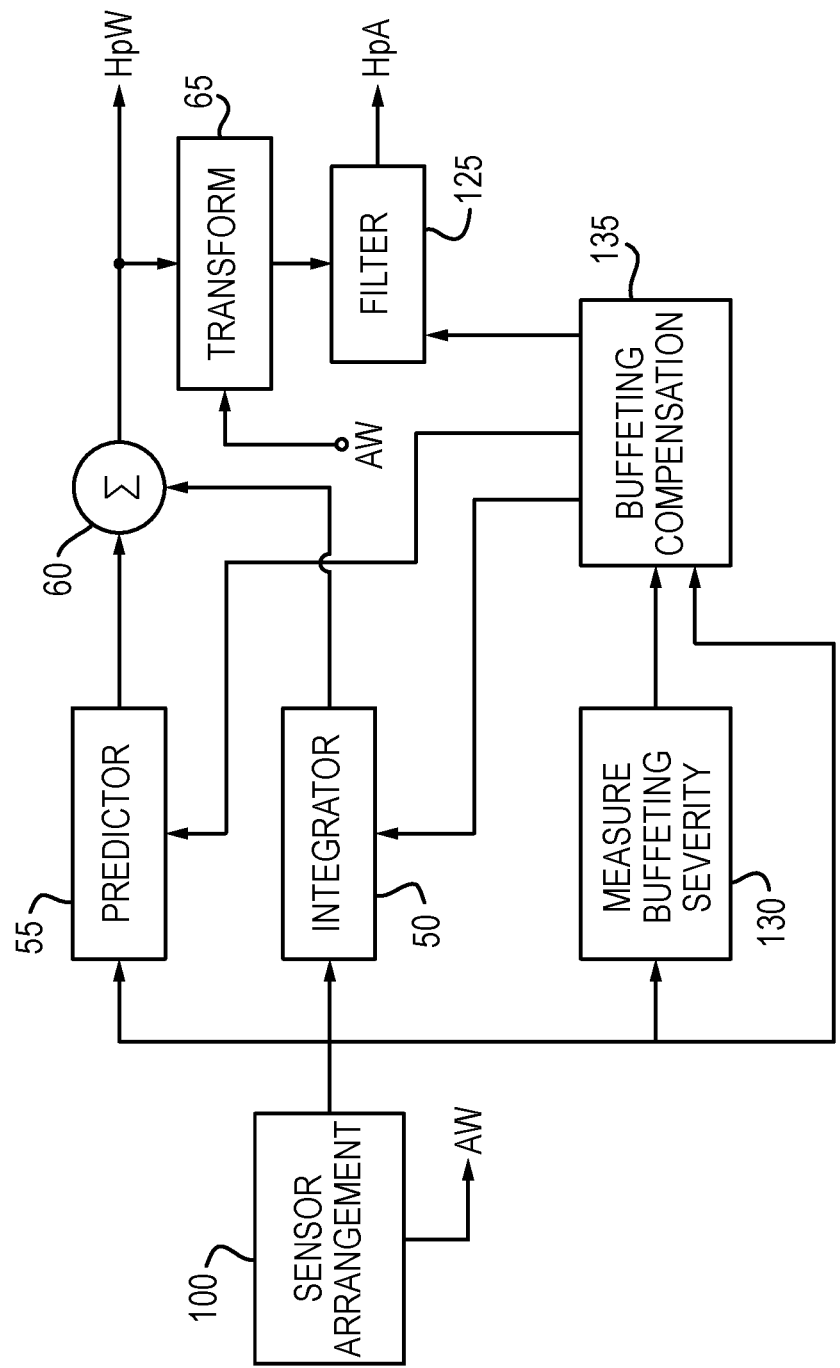
FIG. 3 depicts a section of the functional architecture of FIG. 1 in more detail, including supplementary features according to an example embodiment of the present invention.

Referring to FIG. 3, a logical architecture for the final stages of the hybrid tracker system 1 is shown in more detail as a collection of interworking functional blocks designed to implement a process for detecting helmet buffeting, transferred from the aircraft, or other instances of rapid helmet movement and for helping to mitigate their effects upon the quality of data output by the tracker system and hence the user's ability to read an associated display. The purpose of this process is to produce a buffeting measurement that indicates the severity of buffeting to which the helmet is being subjected. Buffeting is classed as involuntary changes in helmet rotation, usually at frequencies in the region of 10 Hz or above, caused by the transmission of aircraft buffeting to the user's head. The buffeting measurement may be used to modify the behaviour of the Integrator 50, Predictor 55 and Filter 125 to help counteract its effect, to the benefit of the associated helmet-mounted display system.

In FIG. 3, those functional blocks relating to the data sources (5, 10 and 15) and correction of inertial sensor errors (20, 25, 30 and 35), resulting in a fully corrected helmet orientation rate vector $HRate_c$, are represented by a single Sensor Arrangement component 100.

A Measure Buffeting component 130 is provided, arranged to detect helmet movements indicative of buffeting or rapid head movement from the received data, and a Buffeting Compensation component 135 arranged to alter the operating parameters of the Integrator 50, Predictor 55 and Filter 125 to mitigate the effects of the detected buffeting or rapid head movement. The measurement of buffeting is derived from the received corrected helmet rate vectors HRate$_c$ and is performed by a two-stage filter to produce an instantaneous measurement followed by a filtering of the measurement itself.

The first stage filter operates directly on the received helmet rate vectors HRate$_c$ and comprises an FIR filter with symmetric weighting over a predefined time period, including a number of tracker cycles, representing a history of corrected rate vectors. The weighting is at a maximum at the midpoint of the time period and follows a half sine-wave function. Alternatively, with the benefit of reduced processing requirements, the weightings may be uniform across the whole history. For each received rate vector, the filter produces a weighted average rate vector over the history of received rate vectors. This is compared with the mid-history rate vector to produce a delta vector.

The second stage filter takes the same form as the first stage filter but acts on the delta vectors. Again, the filter output is compared with the mid-history input to provide a second order delta vector. The magnitude of this vector is then taken as the instantaneous buffet measurement and is limited to a preconfigured maximum value.

The instantaneous buffet measurement is put through a final filter stage, consisting of a uniformly weighted average, to produce the buffeting severity measurement that is output from the Measure Buffeting component 130 to the Buffeting Compensation component 135.

The Buffeting Compensation component 135 receives the latest buffet level and the latest helmet rotation rate vector HRate$_c$ and calculates parameters that may modify the behaviour of the Predictor component 55 and the output Filter component 125. The calculated parameters are:

Estimation Time—the future period over which the mean helmet rotation rate vector is estimated by the Predictor component 55 ahead of the tracked helmet orientation, if different to the Prediction Time T$_p$;

Integration Time—the time over which the estimated mean rotation rate vector is integrated by the Predictor component 55 to predict the change in helmet orientation H$_p$H during that time; and Filter Latency—the latency required for the final output Filter 125.

Under normal conditions, Estimation Time and Integration Time are both equal to the demanded Prediction Time T$_p$ and the Filter Latency is set to a configured base value. The Estimation Time can be reduced and the filter latency increased in the presence of high levels of buffeting. During rapid helmet rotation, both the Estimation Time and the Integration Time can be extended by the base latency of the output filter.

The first step in this process is to determine the state of a buffet flag. The Buffet Flag indicates whether the level of buffeting warrants any change from the "normal conditions" behaviour of the predictor. The flag is set if the Buffet Level BL calculated by the Measure Buffeting component 130 exceeds a predefined upper threshold and reset if the Buffet Level BL falls below a lower threshold. If the Buffet Level BL is between the two thresholds, the flag is unchanged. This provides hysteresis in the control of the flag.

The Buffeting Compensation component 135 calculates a scaled buffet level as the input buffet level divided by the preconfigured maximum buffet level value used to set the buffet flag. If the buffet flag is set, the scaled buffet level is used to calculate the latency for the predictor output Filter component 125, where greater latency means heavier filtering:

$$L = SL \cdot \log_2 b + BL \quad (3)$$

where L is set to the predefined base latency of the output filter (which is less than BL) and is limited to a maximum latency for the Filter 125, the log term is replaced by zero if it goes negative, SL is a configurable sensitivity factor, BL is a baseline factor for filtering in buffet conditions and b is the scaled buffet level. The maximum permitted latency for the Filter 125 is a predefined constant.

The Estimation Time and Integration Time of the predictor are nominally both equal to the demanded Prediction Time T$_p$ but may be modified by conditions of high buffeting or high rotation rate. If the buffet flag is set and the scaled buffet level exceeds a predefined high level, the Estimation Time is reduced to one cycle. If the buffet flag is not set but the helmet rotation rate exceeds a predefined threshold, the base filter latency is added to the demanded prediction time for both estimation and integration. Under all other conditions both Estimation Time and integration Time are set to the demanded prediction time. An example logic for calculating Estimation Time and Integration Time is shown in the following table.

| Buffet flag set | F | F | T | T |
|---|---|---|---|---|
| Scaled buffet level > high threshold | X | X | F | T |
| \|HRate$_c$\| > high rate threshold | F | T | X | X |
| Estimation Time = demanded T$_p$ | ✓ | — | ✓ | — |
| Estimation Time = cycle time | — | — | — | ✓ |
| Estimation Time = demanded T$_p$ + base latency | — | ✓ | — | — |
| Integration Time = demanded T$_p$ | ✓ | — | ✓ | ✓ |
| Integration Time = demanded T$_p$ + base latency | — | ✓ | — | — |

The Filter component 125 is arranged to apply a final low-pass filter to the predicted helmet orientation H$_p$A, normally with a low latency. The latency may be increased according to equation (3) to mitigate the effects of buffeting and is always defined as an exact number of tracker cycles.

The basic filter type is a Hanning FIR filter. A separate set of weights is pre-configured for each allowed latency from 0 to the maximum allowed latency. In the case of zero latency, the weight set is just the single value 1.0. In general the weight set comprises (2L+1) values where L is the required latency. The selected set of n weights is applied to each component of the most recent inputs of the H$_p$A quaternion. It is assumed that rotation over the maximum latency period is small enough for a simple weighted average of quaternions to be valid, provided the result is normalized. To smooth out discontinuities in the output caused by changes in latency, the following method is used.

The previous cycle's input is re-filtered with the current weights, i.e. the weights selected by the latest filter Latency input L from equation (3). The difference between the last output and the re-filtered output is used to update a delta which is then added to the current filtered output:

$$\Delta v' = \text{fade}(\Delta v + \text{filt}_- - \text{refilt}_-) \quad (4)$$

$$v = \text{filt}_0 + \Delta v' \quad (5)$$

where
- $\Delta v$ is the delta (initialized to zero) to be applied to the filtered value;
- fade is a fade factor (<1) which causes $\Delta v$ to decay towards zero in the absence of discontinuities;
- filt$_-$ is the filter output from the previous cycle;
- refilt$_-$ is the re-filtered output applying the current cycle's weights to the previous cycle's input;
- filt$_0$ is the filter output applying the current cycle's weights to the current cycle's input; and v is the required output value.

Finally, the filtered output is normalized to a unit quaternion by the Filter 125.

Having calculated and filtered the predicted helmet orientation $H_pA$ with respect to aircraft axes as a quaternion, it may be convenient to convert the quaternion representation of orientation into an Euler angle representation, providing the equivalent azimuth, elevation and roll angles, by a well-known method, according to the requirements of a user of the calculated orientation.

Implementation

A typical implementation of a helmet tracker system according to example embodiments of the present invention described above will now be described with reference to FIG. 4.

Figure 4:
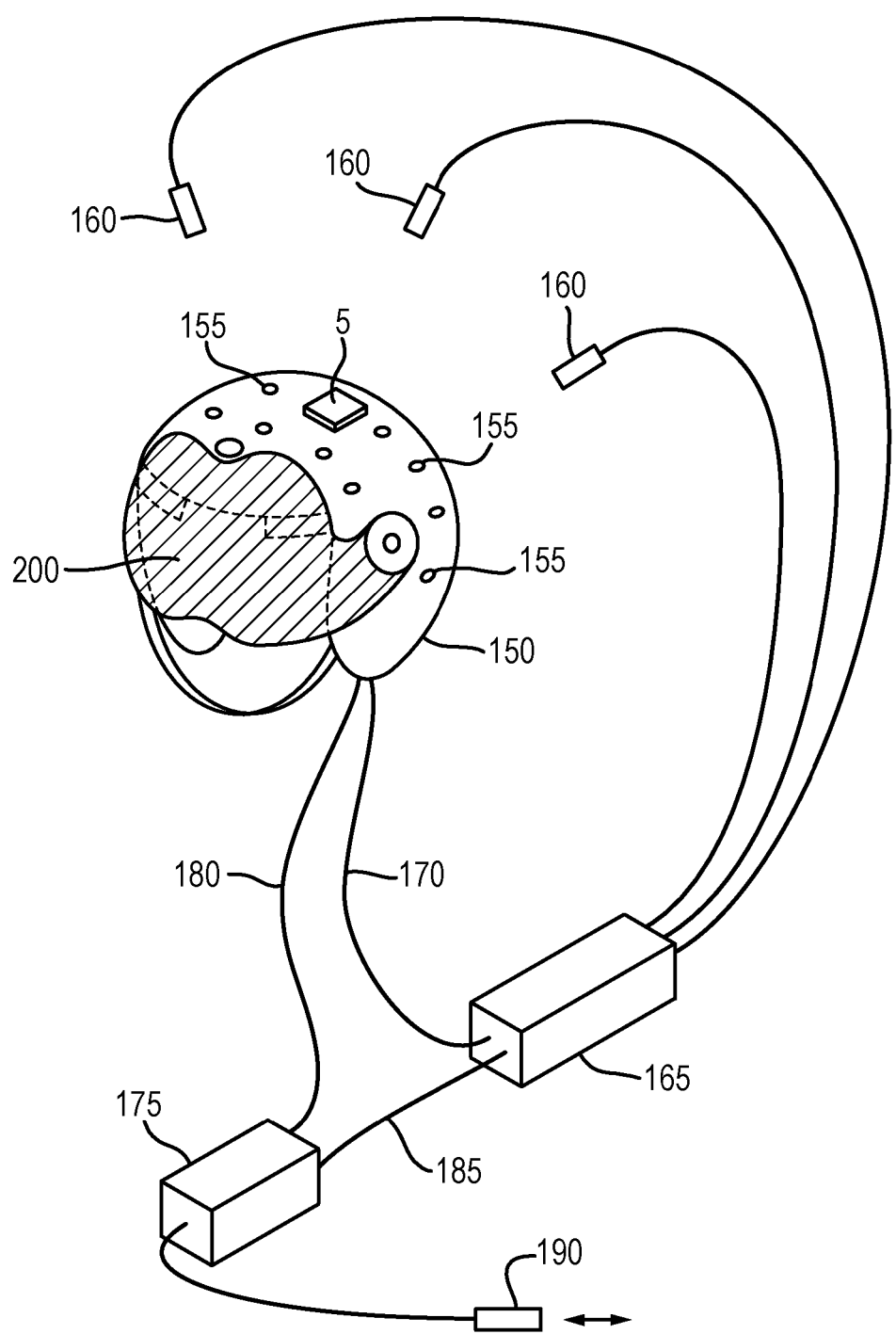
FIG. 4 depicts a representation of a helmet with components suitable for implementing a helmet tracker system according to example embodiments of the present invention.

Referring to FIG. 4, a helmet tracker system is shown integrated with a helmet 150. The helmet tracker system comprises a Helmet-mounted Gyros 5 component, typically a single inertial sensor module containing three gyro elements, fitted to the external shell of the helmet 150, and an Optical Helmet Tracker system. The Optical Helmet Tracker system comprises an arrangement of LEDs 155 integrated within or mounted upon the external shell of the helmet 150 and an arrangement of one or more Cameras 160, each mounted at a fixed position, e.g. within an aircraft cockpit, such they have a line of sight view to at least some of the LEDs 155 at any likely orientation of the helmet 150.

An Optical Helmet Tracker Controller 165 is linked to each of the Cameras 160 to receive image data resulting from the detection of light emitted by the LEDs 155 within the camera's line of sight. The Controller 165 is also linked to the LEDs 155 in the helmet 150 by means of an appropriate Cable 170 such that it may control the illumination of the LEDs 155. The Controller 165 is arranged, for example, to trigger a cyclic illumination of the LEDs 155 in predetermined patterns, to receive the resultant image data from the Cameras 160. The Controller 165 includes a digital processor programmed to implement an appropriate Optical Helmet Tracker algorithm, or a combination of hardware and software-implemented functionality, arranged to illuminate the LEDs 155 and to interpret the resultant image data from the cameras 160 to determine helmet orientation relative to a frame of reference associated with the aircraft, in this example.

A further Processing Module 175 is provided to implement the functionality of the overall helmet tracker system as described above with reference to FIGS. 1 to 4. The Processing Module 175 is linked to the helmet 150 by means of an appropriate Cable 180, principally to receive rate data $GRate_g$ output from the Helmet-mounted Gyros 5, but also to convey image data received from an aircraft-installed image generation system (not shown in FIG. 4), via an interface 190, to a helmet-mounted display integrated within the helmet 150 (not shown explicitly in FIG. 4). The helmet-mounted display system may be a visor-projection display system, or a waveguide-based display, arranged in either case to present images to the pilot such that they appear overlain upon the pilot's view through a visor 200 of an external scene. The Processing Module 175 is arranged to output predicted measures of helmet orientation $H_pA$ and $H_pW$ to the aircraft-installed image generation system via the interface 190 for use in calculating the position of certain types of symbol and data intended for display in the helmet-mounted display, as appropriate.

In a typical aircraft installation of a helmet-mounted display system, incorporating the hybrid helmet tracker system of the present invention, one or more further modules (not shown in FIG. 4) are likely to be installed within the aircraft for the purposes of generating images for display by any display systems installed or in use on the aircraft. Such display systems may include a head-up display (HUD) and/or a head-down display (HDD) in addition to the helmet-mounted display of relevance to applications of the present invention. Such further modules are likely to be linked to a standard aircraft data bus and so have access to aircraft orientation data AW output by an Aircraft Navigation System and to data from other systems with a need to display information to the pilot. Image data including symbols and data for display on the helmet-mounted display, together with updates to aircraft orientation AW received over the aircraft data bus by such further modules, may be passed to the Processing Module 175 by means of the interface 190.

Example embodiments of the present invention have been described in the context of determining orientation of a helmet carrying a helmet-mounted display. This is one example of an application of a tracker system according to the present invention in which the determined orientation is required by an associated image generator to be able to position space-stabilised symbols in an image to be displayed. However, it will be clear to a person of ordinary skill in a relevant field that the techniques described herein may be applied to the determination of orientation of any object with reference to a moveable platform associated with the object, likely to experience buffeting or similar effects.

It will also be clear to the notional skilled person that particular features may be applied independently of others to provide a tracker system according to the present invention having different combinations of the features described.

The invention claimed is:

1. A tracker system for determining orientation of an object, comprising:
    a sensor arrangement associated with the object, arranged to output rate data providing a cyclic indication of a rate of change in orientation of the object; a processor configured to:
    receive the rate data output by the sensor arrangement and to predict from the received rate data an orientation of the object at a predetermined prediction time period ahead of a time point of validity of the received rate data;
    receive the rate data output by the sensor arrangement and to determine therefrom a measure of buffeting severity upon the object; and
    determine whether the determined measure of buffeting severity is greater than a threshold;
    adjust an operating parameter used for the prediction from the received rate data based in part on whether the determined measure of buffeting severity is greater than the threshold or not to compensate for the determined measure of buffeting severity.

2. The tracker system according to claim 1, wherein the processor is configured to calculate the measure of buffeting severity using a two-stage filtering process whereby, at a first stage, upon receipt of each new instance of rate data from the sensor arrangement, a difference is determined between a weighted average of prior-received rate data and a mid-history instance of received rate data and, at a second stage, the measure of buffeting severity in respect of the new instance of rate data is determined as the difference between a weighted average of the prior-determined differences and a mid-history determined difference.

3. The tracker system according to claim 2, wherein the weighted averages are determined using a symmetric weighting profile applied across a history of the received rate data.

4. The tracker system according to claim 3, wherein the symmetric weighting profile comprises a profile of uniform weighting.

5. The tracker system according to claim 2, wherein the processor is further configured to implement a third filter stage arranged to apply a low-pass filter with uniform weighting to the determined measures of buffeting severity.

6. The tracker system according to claim 2, wherein the processor is configured, upon receipt of a new instance of rate data from the sensor arrangement, to estimate an average rate of change in orientation of the object over an estimation time period ahead of a time point of validity of the new instance of rate data and to integrate the estimated average rate of change over an integration time period to give an estimate of the change in orientation of the object, adding the estimated change in orientation to an orientation determined by integrating the received new instance of rate data to give a predicted orientation of the object.

7. The tracker system according to claim 6, wherein the operating parameter is selected from a group consisting of the estimation time period and the integration time period and wherein when the determined measure of buffeting severity is greater than the threshold and the determined measure of buffeting severity divided by the threshold is greater than another threshold, the estimation time period is adjusted.

8. The tracker system according to claim 1, wherein the processor is further configured to implement an output filter component which applies a finite impulse response filter with adjustable latency to the predicted orientation and wherein the processor is further configured to adjust the latency of the applied finite impulse response filter when the determined measure of buffeting severity is greater than the threshold.

9. A computer-implemented method for determining orientation of an object, comprising the steps:
 (i) receiving, from a sensor arrangement associated with the object, rate data providing a cyclic indication of a rate of change in orientation of the object;
 (ii) determining, from the rate data received over a number of cycles, a measure of buffeting severity upon the object;
 (iii) determine whether the determined measure of buffeting severity is greater than a threshold; and
 (iv) predicting, from received the rate data, using a configurable prediction process, an orientation of the object at a predetermined prediction time period ahead of a time point of validity of the received rate data, wherein one or more operating parameters in the configurable prediction process is changed in part based on a relationship between the determined measure of buffeting severity and the threshold.

10. The method according to claim 9 wherein, at step (ii), the measure of buffeting severity is determined using a two-stage filtering process whereby, at a first stage, upon receipt of each new instance of rate data from the sensor arrangement at step (i), a difference is determined between a weighted average of prior-received rate data and a mid-history instance of received rate data and, at a second stage, the measure of buffeting severity in respect of the new instance of rate data is determined as the difference between a weighted average of the prior-determined differences and a mid-history determined difference.

11. The method according to claim 9, wherein step (ii) further comprises applying a low-pass filter with uniform weighting to the determined measure of buffeting severity.

12. The method according to claim 9, wherein the configurable prediction process comprises, upon receipt of a new instance of rate data at step (i), estimating an average rate of change in orientation of the object over an estimation time period ahead of a time point of validity of the received new instance of rate data and to integrate the estimated average rate of change over an integration time period to give an estimate of the change in orientation of the object, adding the estimated change in orientation to an orientation determined by integrating the received new instance of rate data to give a predicted orientation of the object.

13. The method according to claim 12 wherein, at step (iv), when the determined measure of buffeting severity is greater than the threshold and the determined measure of buffeting severity divided by the threshold is greater than another threshold, the estimation time period is adjusted.

14. The method according to claim 9, further comprising the step of applying a finite impulse response filter with adjustable latency to the orientation of the object, wherein when the determined measure of buffeting severity is greater than the threshold, the latency of the finite impulse response filter is adjusted.

15. A head or helmet-mounted digital display device arranged to display space-stabilised symbols or other space-stabilised display artefacts, including a tracker system for determining orientation of a head or a helmet according to claim 1 in which the object is the head or the helmet on which is mounted the head or helmet-mounted display and wherein the predetermined prediction time period corresponds to an expected time of displaying a space-stabilised symbol or other space-stabilised display artefact positioned by the display device to take account of an orientation of the head or helmet indicated by an output of predicted orientation by the tracker system.

16. The tracker system according to claim 1, wherein the object is a head or a helmet or other body-worn item to which the inertial sensor arrangement is attached and wherein the sensor arrangement is arranged to determine and to output rate data indicative of a rate of change in orientation of the head or the helmet or other body-worn item.

17. A non-transitory computer program product comprising a data carrier having stored thereon software code means, or means for access thereto, which when installed and executed upon a digital processor are arranged to implement the method steps recited in claim 9.

18. A digital processor programmed to implement the method steps recited in claim 9.

19. The tracker system according to claim 7, wherein when the determined buffeting severity is less than the threshold and when a rate of rotation is greater than another threshold, the estimation time period and the integration time period is adjusted.

* * * * *